(12) United States Patent
Barnett (10) Patent No.: US 6,533,690 B2
(45) Date of Patent: Mar. 18, 2003

(54) CHAIN GUIDE APPARATUS FOR BICYCLE

(75) Inventor: Robert L. Barnett, 2090 Meyer Pl., Costa Mesa, CA (US) 92627

(73) Assignee: Robert L. Barnett, Costa Mesa, CA (US)

(*) Notice: Subject to any disclaimer, the term of this patent is extended or adjusted under 35 U.S.C. 154(b) by 0 days.

(21) Appl. No.: 09/846,740

(22) Filed: Apr. 30, 2001

(65) Prior Publication Data

US 2002/0160869 A1 Oct. 31, 2002

(51) Int. Cl.⁷ .................................................. F16H 7/18
(52) U.S. Cl. ........................ 474/140; 474/144; 474/116
(58) Field of Search ................................. 474/140, 144, 474/116, 118

(56) References Cited

U.S. PATENT DOCUMENTS

| | | |
|---|---|---|
| 3,869,138 A | 3/1975 | Allison |
| 4,498,890 A | 2/1985 | Sutherland |
| 4,662,862 A | 5/1987 | Matson |
| 5,320,582 A | 6/1994 | Takeda |
| 5,679,084 A * | 10/1997 | Daniels, III ................. 474/140 |
| 5,725,450 A | 3/1998 | Huskey |
| 6,083,132 A | 7/2000 | Walker |

FOREIGN PATENT DOCUMENTS

JP        58-178043    * 10/1983    ............. F16H/7/18

OTHER PUBLICATIONS

Copy of U.S. patent application Ser. No. 09/441,727, filed Nov. 16, 1999.

* cited by examiner

*Primary Examiner*—David A Bucci
*Assistant Examiner*—Timothy McAnulty
(74) *Attorney, Agent, or Firm*—Knobbe, Martens, Olson & Bear LLP (57) ABSTRACT

A bicycle includes a conventional pedal crank and chain drive together with a conventional derailleur shifting mechanism operative to selectively transfer the drive chain between alternative rear sprockets of the bicycle drive system. A chain ring is rotatable in response to pedal crank rotation to transfer pedal crank power to the rear sprockets. A pair of guide blocks define respective internal guide channels through which the drive chain passes toward and from engagement with the chain ring. The guide blocks are maintained at their respective positions by a guide support plate secured to the bicycle frame.

16 Claims, 8 Drawing Sheets

CHAIN GUIDE APPARATUS FOR BICYCLE

BACKGROUND OF THE INVENTION

1. Field of the Invention

This invention relates generally to bicycles and particularly to those having multiple sprocket chain drive systems used in off-road cycling, or mountain biking.

2. Description of the Related Art and Summary of the Invention

The sport of cycling has proven to be an extremely popular and long lasting sport and recreational activity. Through the years, a variety of cycling or biking activities have been pursued by a wide range of participants. Not surprisingly, participants in the various cycling or biking activities and recreations have been operative in a variety of environmental circumstances ranging from high speed competition to slow and casual pleasure riding or cycling. In recent years an interesting type of cycling has emerged which is generally referred to as off-road biking or mountain biking. In this sport activity, participants often ride over extremely rough terrain and challenging hill and mountain trails.

This activity subjects the bicycle and its operative apparatus to extremes in stress, loading and impact. To meet the need for bicycles capable of operating in such high stress and high load environments over such challenging terrain, practitioners in the art have endeavored to provide bicycles which are extremely strong and durable. A competing interest in the production of such strong and durable bicycles is the concurrent need to maintain a substantially light-weight bicycle in order to reduce the energy required to pedal such bicycles across the often hilly and challenging terrain. Toward this end, the typical off-road bicycle utilizes an extremely light-weight frame often fabricated from light-weight exotic metals such as titanium, aluminum and magnesium as well as various high strength alloys thereof. To improve the impact or shock absorption characteristic required to assure sufficient durability and strength of such off-road bicycles, the frame is often fabricated of a plurality of frame portions coupled together using a variety of spring loaded and shock absorbing suspension components. The objective is to provide a frame capable of absorbing substantial impact shock while reducing the energy imparted to the frame through multiple articulated shock absorbing suspension components. The overall objective is, of course, to avoid damage to the light-weight high-strength frame.

Most off-road bicycles utilize chain drive apparatus in which a plurality of varying diameter sprockets are grouped at the rear wheel and are driven by a pedal crank and chain sprocket drive mechanism. A variety of gear ratios or drive ratios are obtained by the use of a chain derailleur mechanism which is operative to transfer the power coupling chain between the various drive sprockets. In this way, the overall drive ratio between the crank and the rear wheel may be varied to allow the user to address; different terrain conditions.

While the multiple sprocket train drive systems in use have been refined to provide extremely effective operation and a wide range of drive ratios to a aid the cyclist introverting challenging hills and trails, a problem often arises due to the combined effect of the flexing shock-absorbing frame and the chain drive system. This problem is known generally as "chain-whipping" and arises as the articulated frame portions flex to absorb impact and as the loading upon the chain drive is varied in different circumstances. The end result is the creation of undesired slack within the drive chain allowing the upper and lower spans of the drive chain to whip up and down and disengage from the front drive sprocket. Drive chain whipping action is more severe in the upper span of the drive chain (the portion between the rear sprocket and the upper edge of the chain ring) than in the lower span of the drive chain (the portion between the rear sprocket and the lower edge of the chain ring). This results from the tendency of the derailleur mechanism to maintain greater tension in the lower span.

Drive chain disengagement can be extremely vexing to a cyclist and under (competitive conditions can cause the cyclist to lose his or her ability to effectively compete. Typically, once the drive chain has disengaged from the front sprocket, or chain ring, the cyclist is required to stop and reset the chain upon the chain ring before continuing. In addition, the sudden release of resisting load caused by the chain skipping from the chain ring also creates the possibility of injury to the rider.

In addition to preventing chain disengagement, it is desirable to provide a chain guide apparatus that prevents the chain from jamming between the chain ring and portions of the chain guide apparatus. Furthermore, because riders of mountain bikes often desire to utilize different size chain rings to suit different riding conditions, it is desirable to provide a chain guide apparatus that is capable of accommodating a variety of chain ring sizes, without requiring adjustment or modification of the apparatus.

Accordingly, it is one goal of the preferred embodiments to provide an improved chain drive system for bicycles. It is a more particular goal to provide an improved chain drive system for bicycles in which the problems of chain-whipping at the front drive sprocket are substantially reduced or eliminated. It is also desired to provide an improved chain guide apparatus which is easily installed and capable of preventing jamming of the drive chain when used with different sized chain rings, without the need to modify or interchange components of the apparatus.

In accordance with a preferred embodiment there is provided a chain guide apparatus for use with a bicycle drive system having a pedal crank, a chain ring rotated thereby, a frame supporting the pedal crank and a drive chain engaging the chain ring. The chain guide apparatus comprises an outer bash guard, an inner bash guard and a first guide extending between the outer and inner bash guards. The first guide substantially entirely surrounds a channel, which is sized and shaped to receive a drive chain. The first guide also defines an inner portion, an outer portion, a first connecting portion extending between the inner portion and outer portion and a second connecting portion extending between the inner portion and the outer portion. The first connecting portion is configured to limit downward movement of at least a portion of the drive chain within the channel and defines the radially innermost connecting edge of the first guide. The radially innermost connecting edge of the guide is separated from the chain ring by a first radial distance equal to at least twice the height of the drive chain.

In accordance with a preferred embodiment there is provided a chain guide apparatus for use with a bicycle drive system having a pedal crank, a chain ring rotated thereby, a frame supporting the pedal crank and a drive chain engaging the chain ring. The chain guide apparatus comprises an outer bash guard, an inner bash guard and a first guide extending between the outer and inner bash guards. The first guide substantially entirely surrounds a channel, which is sized and shaped to receive a drive chain. The first guide also defines an inner portion, an outer portion, a first connecting portion extending between the inner portion and outer portion and a second connecting portion extending between the inner portion and the outer portion. The first connecting portion is configured to limit downward movement of at least a portion of the drive chain within the channel and defines the radially innermost connecting edge of the guide. The radially innermost connecting edge of the guide is separated from the chain ring by a first radial distance equal to at least the length of a link of the drive chain.

In accordance with a preferred embodiment there is provided a chain guide apparatus for use with a bicycle drive system having a pedal crank, a chain ring rotated thereby, a bicycle frame supporting the pedal crank and a drive chain engaging the chain ring. The chain guide apparatus comprises an outer frame, an inner frame and a first guide extending between the outer and inner frames. The outer frame is mountable to at least one of a crank spider and a chain ring defining a crank axis. The first guide defines a channel, which is sized and shaped to receive a drive chain. The first guide also defines a first connecting portion extending between the inner portion and outer portion and a second connecting portion extending between the inner portion and the outer portion. The first connecting portion is configured to limit downward movement of a portion of the drive chain within the channel. The second connecting portion is configured to limit upward movement of a portion of the drive chain within the channel. The first connecting portion defines the radially innermost connecting edge of the first guide. The radially innermost connecting edge is located at least a first radial distance from a first point. The first point is located at least a second radial distance from the crank axis. The first radial distance is at least 0.865 inches and the second radial distance is less than approximately 7.299 inches.

In accordance with a preferred embodiment there is provided a chain guide apparatus for use with a bicycle drive system having a pedal crank, a chain ring rotated thereby, a frame supporting the pedal crank and a drive chain engaging the chain ring. The chain guide apparatus comprises an outer bash guard defining a first plane, an inner bash guard defining a second plane and a first guide extending between the outer and inner bash guards. The first guide defines a channel, which is sized and shaped to receive a drive chain. The first guide also defines a first connecting portion extending between the first plane and the second plane. The first connecting portion is configured to limit downward movement of a portion of the drive chain within the channel. The first guide defines a second connecting portion extending between the first plane and the second plane. The second connecting portion is configured to limit upward movement of a portion of the drive chain within the channel. The first connecting portion defines the radially innermost connecting edge of the guide. The radially innermost connecting edge of the guide is separated from the chain ring by a first radial distance equal to at least twice the height of the drive chain.

In accordance with a preferred embodiment there is provided a chain guide apparatus for use with a bicycle drive system having a pedal crank, a chain ring rotated thereby, a frame supporting the pedal crank and a drive chain engaging the chain ring. The chain guide apparatus comprises an outer bash guard defining a first plane, an inner guard defining a second plane and a first guide extending between the outer and inner bash guards. The first guide defines a channel, which is sized and shaped to receive a drive chain. The first guide also defines a first connecting portion extending between the first plane and the second plane. The first connecting portion is configured to limit downward movement of a portion of the drive chain within the channel. The guide defines a second connecting portion extending between the first plane and the second plane. The second connecting portion is configured to limit upward movement of a portion of the drive chain within the channel. The first connecting portion defines the radially innermost connecting edge of the guide. The radially innermost connecting edge of the guide is separated from the chain ring by a first radial distance equal to at least the length of a link of the drive chain.

In accordance with a preferred embodiment there is provided a chain guide apparatus for use with a bicycle drive system having a pedal crank, a chain ring rotated thereby, a bicycle frame supporting the pedal crank and a drive chain engaging the chain ring. The chain guide apparatus comprises an outer frame defining a first plane, an inner frame defining a second plane and a first guide extending between the outer and inner frames. The outer frame is mountable to at least one of a crank spider and a chain ring defining a crank axis. The first guide defines a channel, which is sized and shaped to receive a drive chain. The first guide also defines a first connecting portion extending between the inner portion and outer portion and a second connecting portion extending between the inner portion and the outer portion. The first connecting portion is configured to limit downward movement of a portion of the drive chain within the channel. The second connecting portion is configured to limit upward movement of a portion of the drive chain within the channel. The first connecting portion defines the radially innermost connecting edge of the guide. The radially innermost connecting edge is located at least a first radial distance from a first point. The first point is located at least a second radial distance from the crank axis. The first radial distance is at least 0.865 inches and the second radial distance is less than approximately 7.299 inches.

In accordance with a preferred embodiment, a bicycle is provided. The bicycle includes a drive system having a pedal crank. A frame supports the pedal crank and a chain ring is rotated thereby. A drive chain engages the chain ring. A chain guide apparatus is also provided which includes an outer bash guard, an inner bash guard, and a first guide extending between the outer and inner bash guard. A first guide substantially entirely surrounds a channel, which is sized and shaped to receive a drive chain. The said first guide defines an inner portion, an outer portion, a first connecting portion extending between the inner and outer portion and a second connecting portion extending between the inner and outer portion. The first connecting portion is configured to limit downward movement of a portion of the drive chain in the channel and defines the radially innermost connecting edge of the first guide. The radially innermost connecting edge of the first guide is separated from the chain ring by a first radial distance equal to at least twice the height of the drive chain.

BRIEF DESCRIPTION OF THE DRAWINGS

These and other features of this invention will now be described with reference to the drawings of preferred embodiments, which are intended to illustrate, and not to limit, the invention. The drawings contain the following figures.

DETAILED DESCRIPTION OF THE PREFERRED EMBODIMENT

Figure 1:
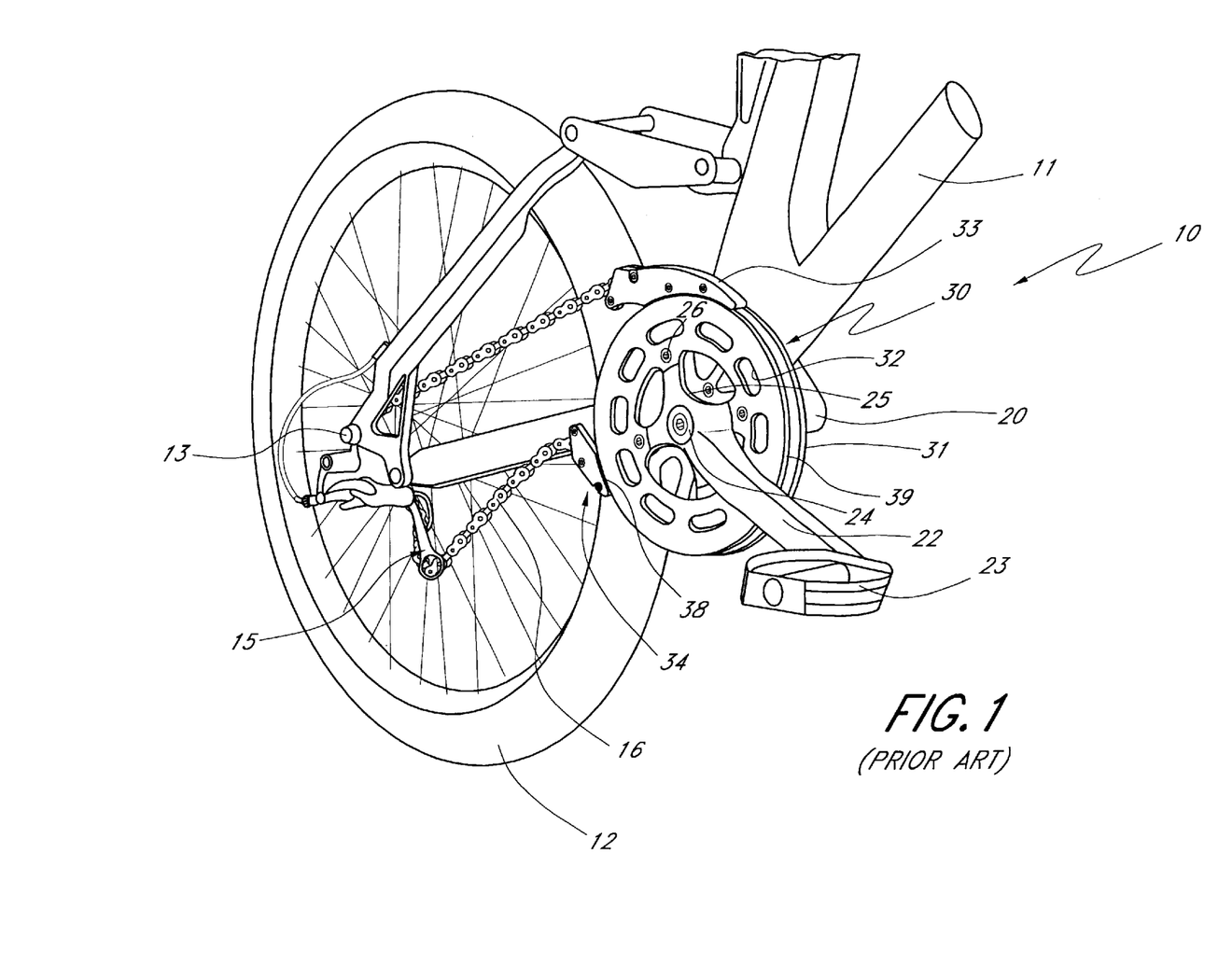
FIG. 1 sets forth a perspective view of a bicycle chain drive system supported upon a typical bicycle.

FIG. 1 sets forth a perspective view of a chain guide apparatus referenced by numeral 30. The chain guide apparatus 30 is supported upon an otherwise conventional bicycle generally referenced by numeral 10. Bicycle 10 is an otherwise conventional off-road or mountain bike an thus includes a light-weight frame 11 supporting a conventional pair of pedal cranks 20 and 22 having a pedal crank shaft 24 extending therebetween. In further accordance with conventional fabrication techniques, frame 11 of bicycle 10 supports a bottom bracket (not shown) which rotatably supports pedal crank shaft 24 in further accordance with conventional fabrication techniques.

The bicycle 10 includes a rear wheel 12 rotatably supported by frame 11 utilizing a rear axle 13. A conventional derailleur 15 is supported proximate to axle 13 upon frame 11. While not seen in FIG. 1, it will be understood that frame 11 supports conventional pedal crank bearings for rotatably supporting pedal crank shaft 24 to facilitate rotation of pedal crank shaft 24 as pedal cranks 20 and 22 are rotated by the riders force applied to pedals 23 thereof.

Figure 3:
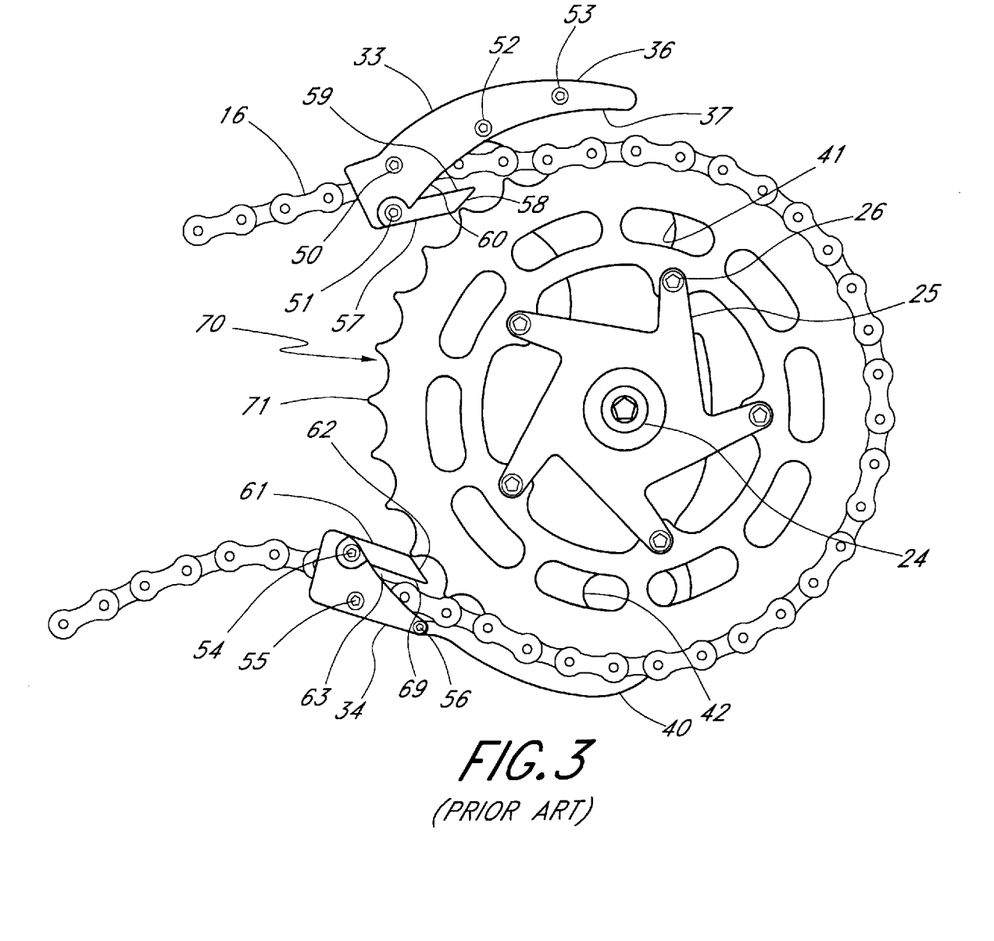
FIG. 3 sets forth a side elevation view of the drive apparatus of FIG. 1 having the pedal crank and bash ring removed.

A generally star shaped spider 25 is coupled to pedal crank shaft 24 by conventional attachment means (not shown) and is rotatable with pedal crank shaft 24. A generally planar annular bash ring 31 defines an outer edge 39 together with a plurality of arcuate bash slots 32. A plurality of fasteners 26 and threaded nuts 27 cooperate to secure spider 25 to bash ring 31. Accordingly, bash ring 31 is supported by spider 25 and is rotatable in combination therewith as pedal cranks 20 and 22 are rotated. As is illustrated in FIG. 3, a chain ring 70 is also secured to spider 25 and defines a plurality of teeth 71.

Returning to FIG. 1, a drive chain 16 fabricated in accordance with conventional fabrication techniques is received upon a rear sprocket 14 of rear wheel 12 and is further guided by derailleur 15. Drive chain 16 further passes upon chain ring 70 (FIG. 3) and thereby engages the chain ring 70. While not seen in FIG. 1, it will be understood that sprocket 14 is one of several differently sized sprockets supported upon axle 13 which are selectively engaged by drive chain 16 through the action of derailleur 15. The operation of derailleur 15 and the plurality of sprockets upon rear wheel 12 and axle 13 operate in a conventional manner to provide variation of drive or gear ratio for the rider of bicycle 10.

A guide support plate 40 (FIG. 4) is secured to frame 11 by conventional attachment and supports an upper guide block 33 and a lower guide block 34. The upper guide block 33 and lower guide block 34 define respective internal guide channels 60 and 63 (FIG. 3) through which drive chain 16 passes as it engages chain ring 70. The upper guide block 33 and lower guide block 34 are positioned with respect to bash ring 31 and chain ring 70 (FIG. 3) to maintain drive chain 16 in engagement with chain ring 70 despite the above described chain-whipping forces which bicycle 10 may encounter during off-road or mountain biking activities.

The upper guide block 33 defines an elongated generally curved extended ramp portion 36 having an arcuate edge 37 which is positioned close to edge 39 of bash ring 31. The position of extended ramp 36 and particularly edge 37 thereof, further maintains the proper position of drive chain 16 during the various whipping forces which bicycle 10 may induce during riding activities. Similarly, the position of lower guide block 34 is selected to position edge 38 proximate to edge 39 of bash ring 31 to further guide and maintain the position of drive chain 16.

In operation, as the user rotates pedal cranks 20 and 22 by foot pressure applied to pedals 23 (one pedal not shown), pedal crank shaft 24 is rotated. The rotation of pedal shaft 24 rotates spider 25 which, in turn, rotates bash ring 31 and chain ring 70 (FIG. 3). The rotation of chain ring 70 moves drive chain 16 which in turn rotates the engaged sprocket of rear wheel 12 such as sprocket 14 to propel bicycle 10. In accordance with the anticipated activities to which bicycle 10 is subjected in off-road or mountain biking, the movement of articulated suspension members coupled to frame 11 which support rear wheel 12 as well as the action of derailleur 15 may produce the above described chain-whipping action by drive chain 16. The chain-whipping actions of drive chain 16 would, but for the operation of upper guide block 33 and lower guide block 34 of chain guide 30, have a tendency to disengage drive chain 16 from chain ring 70. The operation of upper guide block 33 and lower guide block 34, however, prevents the disengagement of drive chain 16 due to the restrictive movement allowed by the guide blocks upon chain 16 as it passes through the internal guide channels 60, 63.

The bash ring 31 and chain ring 70 are provided with a plurality of bash slots 32 and 72 (FIG. 3). The position of the bash slots within bash ring 31 and chain ring 70 facilitate the clearance of bash and other debris which may be picked up by drive chain 16 during operation upon muddy trails or terrain. Under normal circumstances, accumulated mud carried by drive chain 16 which becomes enmeshed in the chain drive apparatus of bicycle 10 is squeezed outwardly through mud slots within bash ring 31 and chain ring-70 (seen in FIG. 3). The operation of the mud slots within bash ring 31 and chain ring 70 allows this mud to clear out from the chain and sprocket mechanism and thereby maintains proper operation of bicycle 10.

As set forth below in greater detail, the preferred fabrication of upper guide block 33 and lower guide block 34 utilizes a pair of generally mirror-image portions which are secured together using a plurality of fasteners. In further accordance with the preferred fabrication of the chain guide apparatus 30, the mirror-image portions of guide blocks 33 and 34 are fabricated of a high-strength plastic or composite polymer material. It will be apparent to those skilled in the art however, that other suitable materials and fabrication methods may be used.

Figure 2:
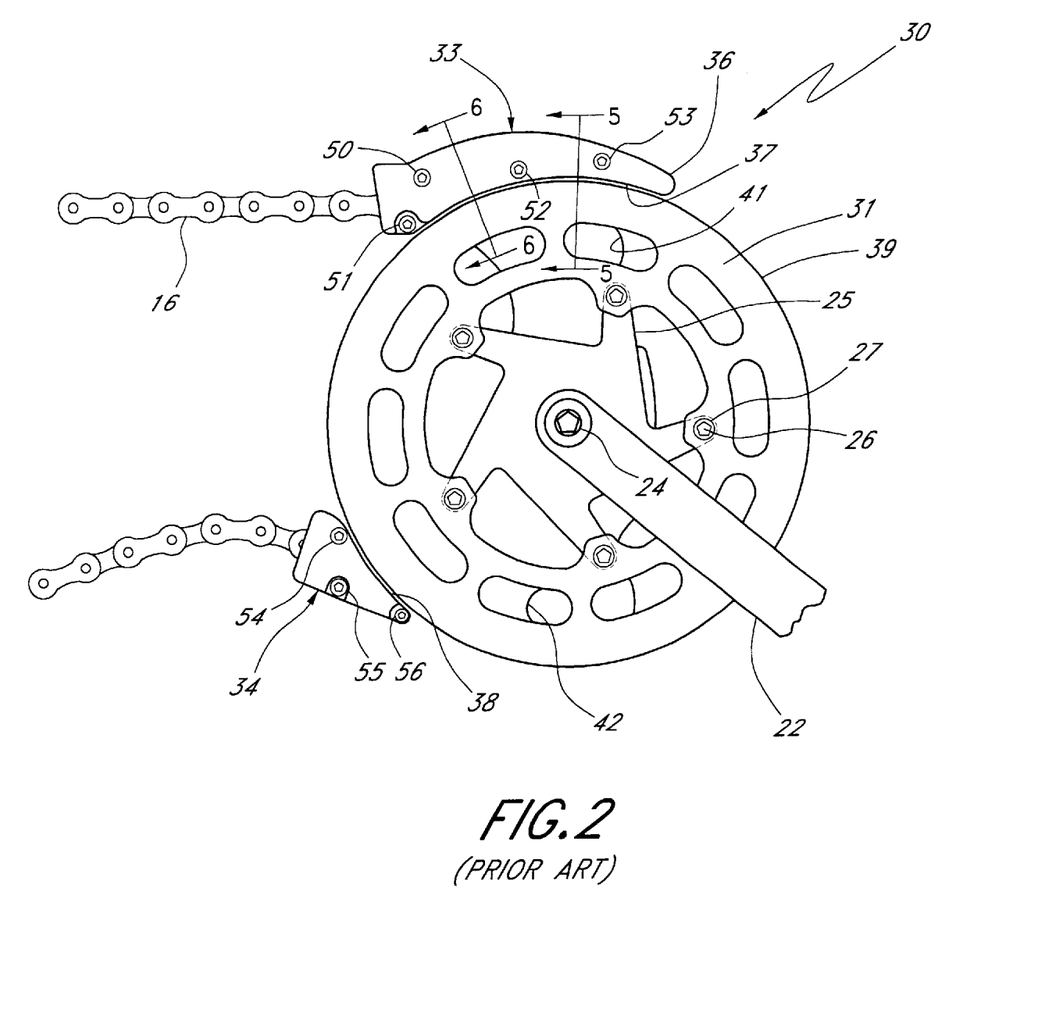
FIG. 2 sets forth a side elevation view of the chain guide apparatus of FIG. 1 upon a typical bicycle chain drive.

FIG. 2 sets forth a side elevation view of chain guide apparatus 30 in a typical assembly upon a conventional pedal crank bicycle mechanism. As described above, a pedal crank shaft 24 supports a pair of pedal cranks 22 and 20 (pedal crank 20 seen in FIG. 1) in a rotatable attachment utilizing conventional fabrication techniques, such as corresponding tapered surfaces or splined engagement. Pedal crank shaft 24 supports a spider 25 having a plurality of outwardly extending portions. A bash ring 31 comprising a substantially planar annular member defines a circular outer edge 39 and is secured to the extending portions of spider 25 by a plurality of threaded fasteners 26 and a plurality of cooperating nuts 27. Spider 25 is engaged with pedal crank 22 by conventional attachment means, or may be integrally formed therewith, and is thus rotatable in combination with pedal crank shaft 24.

Bash ring 31 further defines a plurality of arcuate mud slots 32 which are positioned upon bash ring 31 to facilitate the outward movement of mud accumulated within the drive mechanism of the host bicycle utilizing chain guide apparatus 30. As is illustrated in FIG. 3, spider 25 also supports a generally annular chain ring 70 having a plurality of teeth 71 extending radially outwardly therefrom. As is also illustrated in FIG. 3, a drive chain 16 passes about and engages chain ring 70 through the cooperation of chain 16 and teeth 71.

The chain guide apparatus 30 includes a guide support plate 40 secured to the host bicycle frame in accordance with conventional fabrication techniques (not shown) to provide stationary attachment of guide support plate 40. Guide support plate 40 defines a pair of arcuate mud slots 41 and 42 and further supports an upper guide block 33 and a lower guide block 34. Upper guide block 33 is secured to and supported by guide support plate 40 using a plurality of conventional threaded fasteners 50, 51 and 52. As mentioned above, upper guide block 33 is preferably fabricated of a pair of generally mirror-image portions which are secured together using a plurality of fasteners 50, 51, 52 and 53 to provide the combined structure of upper guide block 33.

The upper guide block 33 includes a generally curved extended ramp 36 having an arcuate edge 37 formed on the underside thereof. Arcuate edge 37 defines a curvature generally corresponding to edge 39 of bash ring 31. In accordance with the preferred fabrication of the chain guide apparatus 30, upper guide block 33 is positioned upon guide support plate 40 to closely space arcuate edge 37 proximate edge 39 of bash ring 31.

Figure 4:
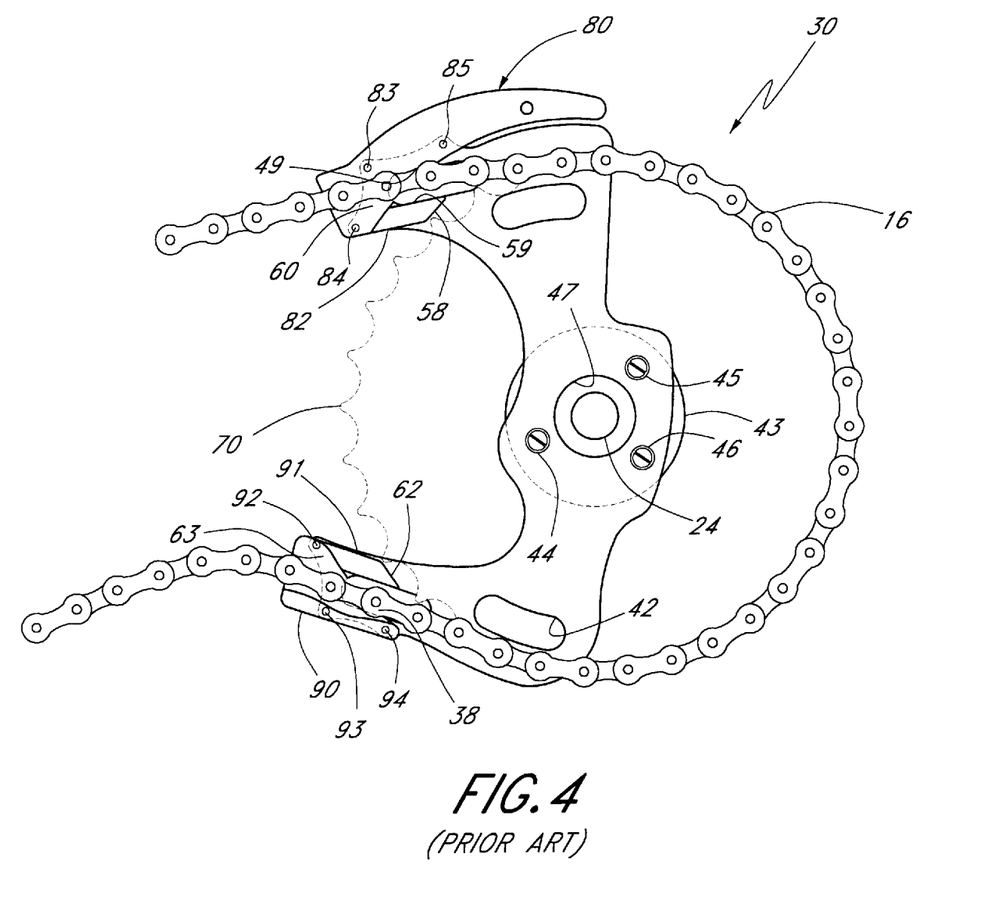
FIG. 4 sets forth the chain guide apparatus of FIG. 1 together with a phantom outline of a front sprocket of a bicycle.

With reference to FIG. 4, upper guide block 33 defines an internal guide channel 60 through which drive chain 16 passes. The captivation of drive chain 16 within the internal channel of upper guide 33 maintains the engagement of drive chain 16 upon chain ring 70 (seen in FIG. 3) and resists the above-described chain-whipping forces. The close positioning of arcuate edge 37 with respect to edge 39 of bash ring 31 further assures the captivation of drive chain 16.

In further accordance with this embodiment, the chain guide apparatus 30 includes a lower guide block 34 also preferably formed of generally mirror-image portions which are assembled to form lower guide block 34 by a plurality of fasteners 54, 55 and 56. In similarity to upper guide block 33, lower guide block 34 defines an arcuate edge 38 having a curvature substantially identical to edge 39 of bash ring 31. In further similarity to upper guide block 33, lower guide block 34 defines an internal guide channel 63 (FIG. 4) through which drive chain 16 passes. The close positioning of lower guide block 34 and the captivation of arcuate edge 38 and internal guide channel 63 cooperate to further maintain the proper position and engagement of drive chain 16 upon chain ring 70 (seen in FIG. 3) and resist the above described chain-whipping forces.

FIG. 3 sets forth the side elevation view of chain guide apparatus 30 shown in FIG. 2 and having pedal crank 22 and bash ring 31 removed. As described above, pedal crank shaft 24 is rotatably supported upon the host bicycle by conventional means (not shown) and is rotated through the peddling action of the user. As also described above, spider 25 includes a plurality of outwardly extending members and is secured to pedal crank shaft 24, or pedal crank 22 by conventional means (not shown) to cause spider 25 to be rotatable in combination with pedal crank shaft 24. A substantially annular chain ring 70 defines a plurality of outwardly extending radially spaced sprocket teeth 71 and is secured to spider 25 by a plurality of conventional threaded fasteners 26. Chain ring 70 further defines a plurality of arcuate mud slots 72 which are positioned in substantial alignment with mud slots 32 of bash ring 31 (FIG. 2). A conventional drive chain 16 fabricated of a plurality of pivotally-joined chain links is received upon chain ring 70 and engages teeth 71 to provide operative drive coupling between chain ring 70 and the rear sprockets of the host bicycle in the manner set forth above in FIG. 1.

The chain guide apparatus 30 includes a guide support plate 40 secured to the host bicycle frame by conventional attachment (not shown). Guide support plate 40 defines a pair of arcuate mud slots 41, 42 generally aligned with mud slots 72 of chain ring 70. Guide support plate 40 further supports an upper guide block 33 and a lower guide block 34. As described above, upper guide block 33 includes an extended ramp 36 and an arcuate edge 37. As is also described above, upper guide block 33 is joined to guide support plate 40 by a plurality of fasteners 50, 51 and 52. Fastener 53 provides attachment between the mirror-image portions of upper guide block 33. As is better seen in FIG. 4, upper guide block 33 defines an internal guide channel 60 through which drive chain 16 passes. In addition, upper guide block 33 further defines a forwardly extending guide finger 57 which in turn defines a support ramp 59 and an arcuate edge 58. Support ramp 59 of guide finger 57 provides a further captivating surface for drive chain 16 which supports drive chain 16 between guide channel 60 and chain ring 70. Arcuate edge 58 is positioned close to the extension of teeth 71 to further guide drive chain 16 in its engagement of chain ring 70.

Lower guide block 34 is secured to guide support plate 40 by a plurality of fasteners 54, 55 and 56. As described above, lower guide block 34 defines an arcuate edge 38 and an internal guide channel 63 (FIG. 4). Drive chain 16 passes through the internal channel of lower guide block 34. Arcuate edge 38 cooperates with bash ring 31 (seen in FIG. 2) to further captivate drive chain 16 and resist chain-whipping forces acting on the drive chain 16. The lower guide block 34 includes a forwardly extending guide finger 61 which, in turn, defines a support ramp 69 and an arcuate edge 62. Support ramp 69 is positioned to further guide chain 16 as it spans the space between chain ring 70 and channel 63 of lower guide block 34.

Support ramps 59 and 69 operate to ensure that guide chain 16 does not get carried downwardly from upper guide block 33 during reverse direction pedal rotation nor upwardly from lower guide block 34 during forward direction pedal rotation. This prevents drive chain 16 from getting jammed in teeth 71 of chain ring 70.

During off-road bicycle riding, riders pedal forwardly to increase speed and/or apply power to the rear wheel. Riders may choose to pedal in the reverse direction through partial rotation movements to align the pedal cranks in a generally horizontal position to maximize ground clearance. Thus, riders may need to rapidly switch between forward and reverse directions of pedal rotation increasing the likelihood of chain-whipping and chain-jamming problems, which the chain guide apparatus 30 prevents.

FIG. 4 sets forth chain guide apparatus 30 having the outer portions of upper guide block 33 and lower guide block 34 removed to reveal the shape and structure of interior guide channels 60 and 63 respectively. For purposes of illustration, the chain ring 70 is shown in phantom line representation upon chain guide apparatus 30.

Chain guide apparatus 30 includes a guide support plate 40 formed of a ridged planar material such as aluminum or the like. Guide support plate 40 is secured to the host bicycle by attachment to a mount ring 43 which in accordance with conventional fabrication techniques is secured to the bottom bracket of a host bicycle (not shown). A plurality of threaded fasteners 44, 45 and 46 are used in securing guide support plate 40 to mount ring 43. Thus, guide support plate 40 is secured in a fixed position upon the host bicycle. Guide support plate 40 further defines an aperture 47 through which pedal crank shaft 24 passes together with a pair of arcuate mud slots 41 and 42.

In accordance with fabrication of one embodiment of the chain guide apparatus 30, upper guide block 33 and lower guide block 34 (FIG. 3) are preferably formed of substantially mirror-image portions which are secured together by a plurality of fasteners to form guide blocks 33 and 34. For purposes of illustration, the outer guide block portions of upper guide block 33 and lower guide block 34 have been removed in FIG. 4 to allow for description of the internal guide channels of guide blocks 33 and 34 and their interaction with drive chain 16. Thus, guide block portion 80 of upper guide block 33 is shown in FIG. 4 upon guide support plate 40 while guide block portion 90 of lower guide block 34 is similarly shown upon guide support plate 40.

Guide block portion 80 defines a generally curved ramp portion 81 having an arcuate edge 37 formed thereon. Guide block portion 80 further defines a plurality of apertures 83, 84, 85 and 86. An internal guide channel 60 having a guide channel roof surface 49 is formed within guide block portion 80 through which drive chain 16 passes. Guide block portion 80 further includes a finger guide portion 82 having a support ramp 59 and an arcuate edge 58 formed thereon. Edge 58 is positioned in close proximity to chain ring 70 in the manner seen in FIG. 3. Arcuate edge 37 is positioned proximate to edge 39 of bash ring 31 in the manner seen in FIG. 2. It will be understood that the mirror-image portion of upper guide block 33 (guide block portion 100 seen in FIG. 5) is substantially mirror-image formed to guide block portion 80 and thus defines a substantially mirror-image shape to complete guide channel 60 and enclose drive chain 16 as it passes through upper guide block 33 in the manner seen in FIG. 3. Apertures 83, 84 and 85 receive fasteners 50, 51 and 52, respectively to secure guide block portions 100 (seen in FIG. 5) and 80 in there common attachment as well as attachment to guide support plate 40. Aperture 86 receives fastener 53 (seen in FIG. 3) to secure guide block portions 100 and 80 together to secure the assembly of upper guide block 33.

Guide block portion 90 defines a guide channel 63 and a plurality.of apertures 92, 93 and 94. Guide block portion 90 further defines an arcuate edge 38 and a forwardly extending finger portion 91. Guide finger portion,91 in turn defines a support ramp 69 and an arcuate edge 62. In a similar manner to the above described fabrication of upper guide block 33, lower guide block 34 (FIG. 3) is formed of substantially mirror-image portions to complete the guide block structure. A guide channel 63 is formed in guide block portion 90 through which drive chain 16 passes.

Figure 5:
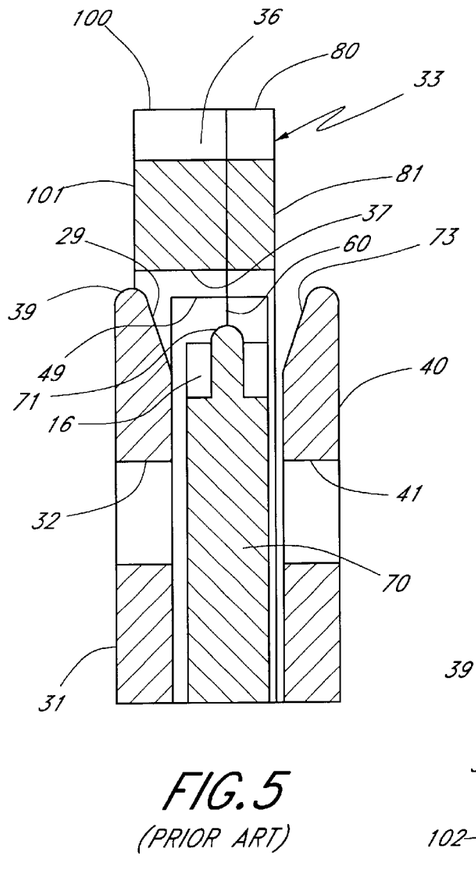
FIG. 5 sets forth a partial section view of the chain guide apparatus of FIG. 1 taken along section lines 5—5 in FIG. 2.

FIG. 5 sets forth a partial section view of chain guide apparatus 30 taken along section lines 5—5 in FIG. 2. Guide support plate 40 defines a mud slot 41 and an angled surface 73. An upper guide block 33 is formed of a guide block portion 80 and a guide block portion 100 having generally mirror-image shapes. Guide block portions 80 and 100 are commonly joined and secured to guide support plate 40 in the above-described manner. Upper guide block 33 defines an extended ramp 33 formed of ramp portions 81 and 101 of guide block portions 80 and 100 respectively. A guide channel 60 having a guide channel roof surface 49 is formed within upper guide block 33. An arcuate edge 37 is formed on the underside of extended ramp 36. A chain ring 70 defines a plurality of radially extending teeth 71 and is rotatably supported to engage a drive chain 16. A bash ring 31 having a plurality of mud slots 32 formed therein is rotatable with chain ring 70 and defines an angled surface 29 and an outer edge 39. The upper guide block 33 is positioned upon guide support plate 40 such that arcuate edge 37 is proximate to edge 39 of bash ring 31.

In operation, drive chain 16 passes through guide channel 60 of upper guide block 33 and engages teeth 71 of chain ring 70. The engagement and position of drive chain 16 upon chain ring 70 is aided and maintained in opposition to the above described chain-whipping forces by the cooperation of guide channel 60 and angled surfaces 73 and 29. In addition, the close positioning of arcuate edge 37 with respect to edge 39 of bash ring 31 an angled surface 73 of guide support plate 40 further captivates and guides drive chain 16 to maintain proper engagement between drive chain 16 and chain ring 70.

Figure 6:
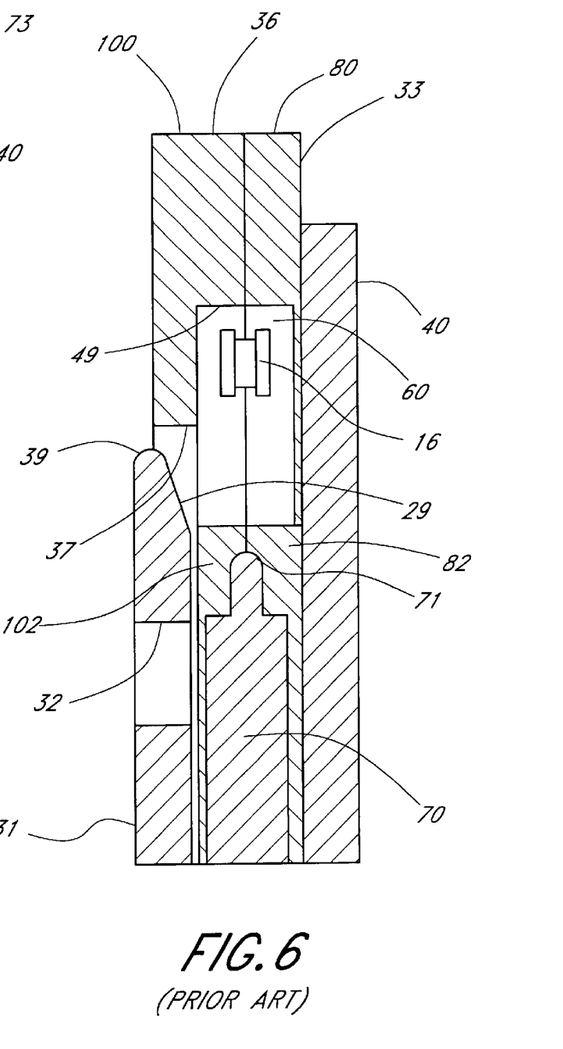
FIG. 6 sets forth a partial section view of the chain guide apparatus of FIG. 1 taken along section lines 6—6 in FIG. 2.

FIG. 6 sets forth a partial section view of chain guide apparatus 30 taken along section lines 6—6 in FIG. 2. A guide support plate 40 supports an upper guide block 33 formed of a pair of guide block portions 80 and 100. Guide block portions 80 and 100 are generally mirror-image in shape and define a guide channel 60 and a guide channel roof surface 49 passing therethrough. A drive chain 16 passes through guide channel 60 in the manner illustrated in FIG. 3. As described above, guide block portions 80 and 100 are commonly joined and secured to guide support plate 40 by a plurality of fasteners in the manner best seen in FIG. 3. Guide block portion 80 further defines a finger portion 82 while guide block portion 100 defines a mirror-image finger portion 102. In combination, portions 82 and 102 form a guide finger 57 (seen in FIG. 3).

A chain ring 70 having a plurality of radially extending teeth 71 is rotatably supported along side guide support plate 40. A bash ring 31 is rotatable in combination with chain ring 70 as described above and defines an outer edge 39, an angled surface 29 and a mud slot 32. Guide block portion 100 defines an arcuate edge 37 which is positioned in close proximity to edge 39 of bash ring 31. In the section view shown in FIG. 6, drive chain 16 extends through channel 60 and is maintained in general alignment with teeth 71 of chain ring 70 by the cooperation of channel 60 together with guide support plate 40 and bash ring 31.

What has been shown is a chain guide apparatus which utilizes a guide support plate supporting a pair of guide blocks positioned with respect to a chain ring and drive chain to resist disengagement of the drive chain from the chain ring due to chain-whipping forces commonly encountered in off-road and mountain bike activities. Each guide block defines an internal guide channel through which the guide chain passes and within which the drive chain is captivated to restrict its movement in response to chain-whipping forces and thereby avoid disengagement of the drive chain from the chain ring.

Figure 7:
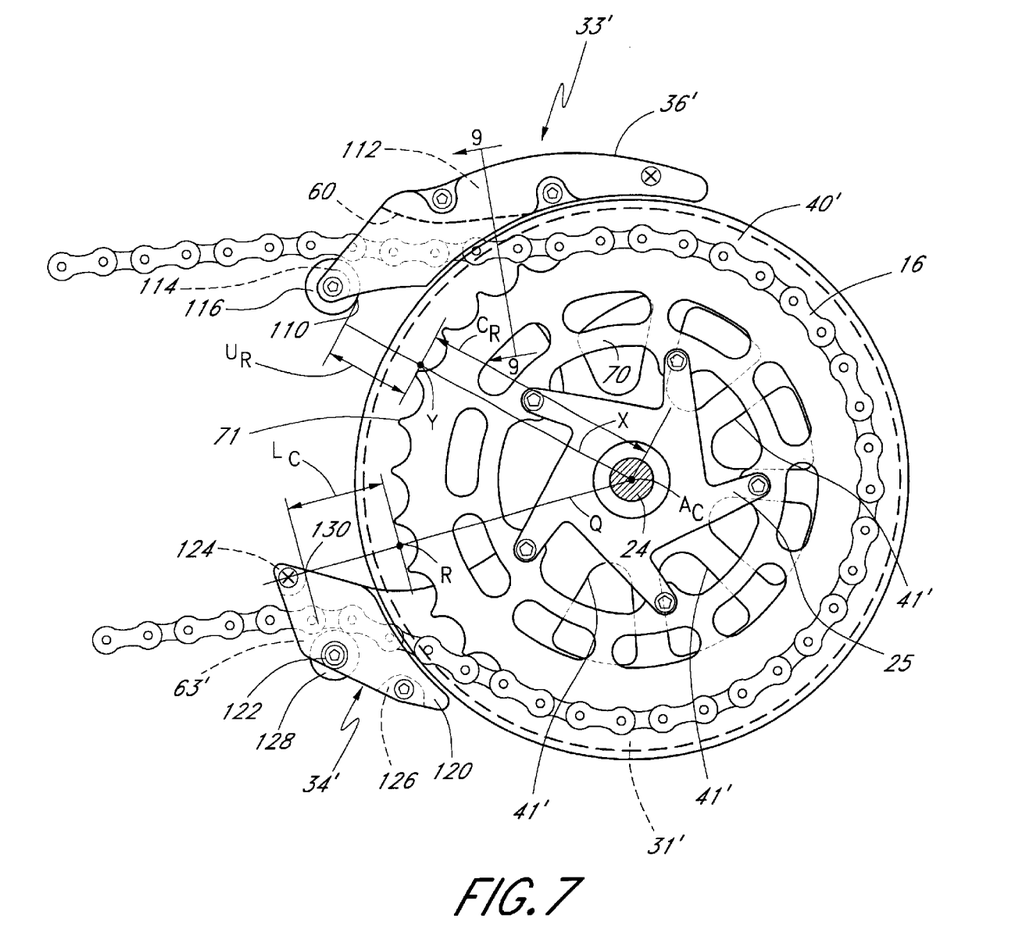
FIG. 7 sets forth a side elevation view of an improved embodiment of the chain guide apparatus.
Figure 8:
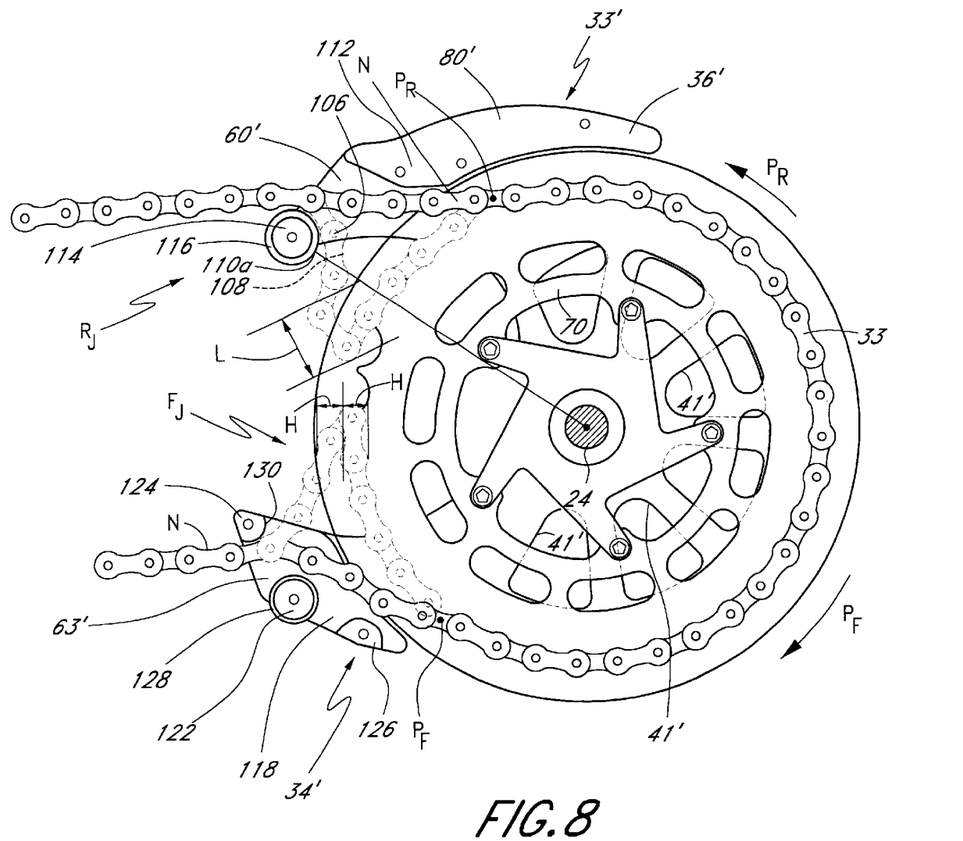
FIG. 8 sets forth a side elevation view of the improved chain guide apparatus of FIG. 7, having certain outer components removed therefrom.
Figure 9:
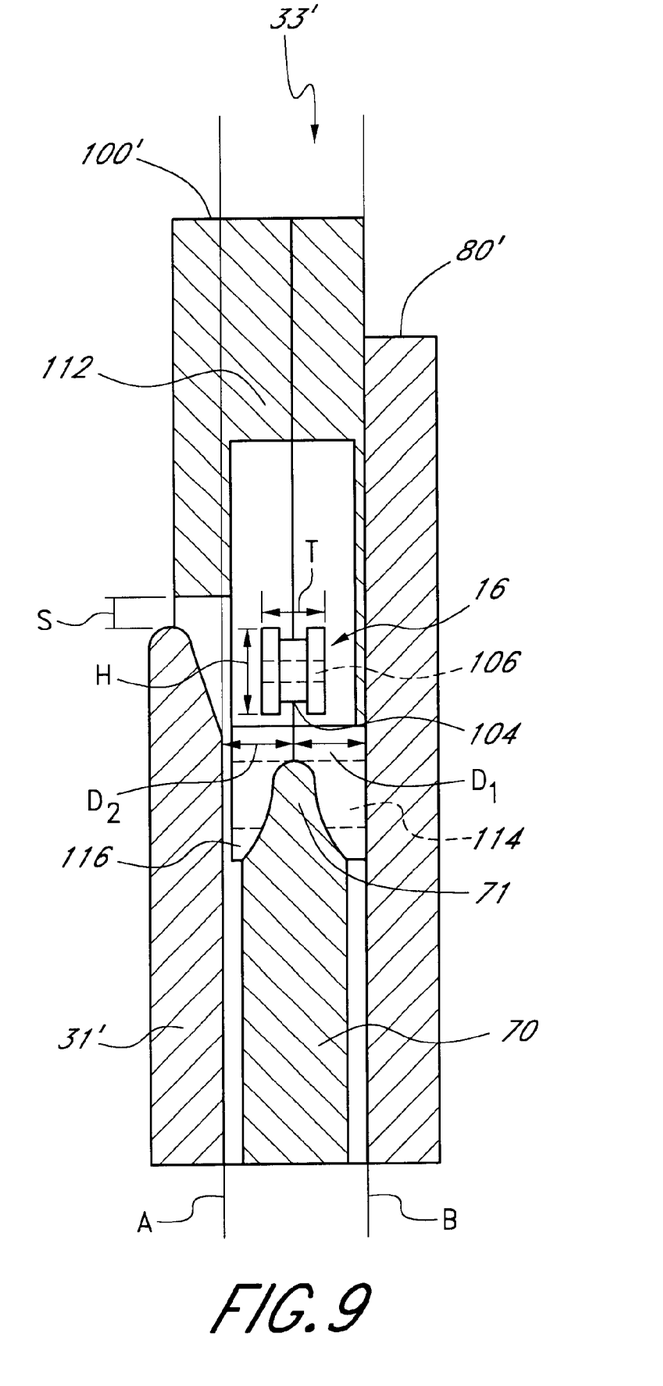
FIG. 9 sets forth a partial section-view of the chain guide apparatus of FIG. 7 taken along section lines 9—9 in FIG. 7.

FIGS. 7–9 illustrate an improved embodiment of the chain guide apparatus 30'. The chain guide apparatus 30' performs in a similar manner as the chain guide apparatus 30 described with reference to FIGS. 1–6. Accordingly, like reference characters will be used to describe like components, except that a (') will be used to denote modified components.

As described above, a rider pedals forwardly to increase speed and/or apply power to the rear wheel 12. In addition, a rider may often pedal in a reverse direction to align the, pedal cranks 20, 22 in a generally horizontal position in order to maximize ground clearance of the pedals 23 and generally enhance balance and control of the bicycle 10. As mentioned above, during either forward or reverse pedaling, the drive chain 16 may be carried by the chain ring 70 so that it becomes wedged, or jammed, between the chain ring 70 and either the lower guide block 34 or upper guide block 33, respectively. This condition is also referred to as "chain-suck" because the chain 16 is sucked by the chain ring 70 beyond its normal point of release.

The condition of chain jamming due to chain-suck is conceptually illustrated in FIG. 8. Chain-suck and jamming usually occurs in muddy conditions as the mud tends to adhere the drive chain 16 to the chain ring 70, such that the chain 16 continues to rotate with the chain ring 70 beyond its normal point of separation. The normal point of separation, generally referred to as P, is the point where the drive chain 16 will normally separate from the chain ring 70, if no chain-suck forces are present. This is typically substantially a tangent point on the chain ring 70 determined by a tangent line between the chain ring 70 and the next supporting object of the chain 16, which may be the rear sprocket 14 or a portion of a guide block 33, 34. Chain-suck may also occur due to a generally dirty drive chain 16, even in dry conditions, due to a build up of dust and chain lube tending to carry the drive chain 16 along with the chain ring 70, in a manner similar to mud-induced chain-suck.

FIG. 8 illustrates a chain-suck condition due to a reverse pedaling motion $P_R$ generally by the reference character $R_J$. In this condition $R_J$, the drive chain 16 has been carried by the chain ring 70 beyond the point where it would normally separate from the chain ring 70 (i.e., the reverse pedaling motion release point $P_R$) to a position between the upper guide block 33 and the chain ring 70. Similarly, a chain-suck condition due to a forward pedaling motion $P_F$ is illustrated generally by the reference character $F_J$. In this condition $F_J$, the drive chain 16 has been carried by the chain ring 70 beyond the point where it would normally separate from the chain ring 70 (i.e., the forward pedaling motion release point $P_F$) to a position between the lower guide block 34 and the chain ring 70.

As described above, the chain guide apparatus 30, illustrated in FIGS. 1–6, is equipped with guide finger portions 57, 61 on the upper and lower guide blocks 33, 34, respectively. The guide fingers 57, 61 extend forwardly to a position proximate the chain ring 70 such that the drive chain 16 is not able to pass between the guide fingers 57, 61 and the chain ring 70 (FIG. 3). Thus, chain-suck conditions $R_J$ and $F_J$ are prevented by upper guide finger 57 and lower guide finger 61, respectively.

Although the guide finger portions 57, 61 prevent chain-suck conditions $R_J$, $R_F$ when properly installed and maintained, many users of the chain guide apparatus 30 fail to read, or properly follow, installation instructions or fail to properly maintain the guide finger portions 57, 61 of the chain guide apparatus 30. For example, because the chain ring 70 may vary in the number of teeth 71 (and therefore diameter) between bicycles, the guide fingers 57, 61 must often be trimmed to a proper length for the size of chain ring 70 to be employed. If too much material is trimmed away, new guide fingers 57, 61 must be purchased, and properly trimmed, in order for the chain guide apparatus 30 to properly prevent chain-suck conditions $R_J$, $R_F$.

Additionally, some riders utilize different size chain rings 70 to suit the individual characteristics of the course they will be riding on. For example, on a relatively flat, or uphill course, a smaller chain ring 70 having fewer teeth 71 may be used to provide an advantageous torque ratio between the chain ring 70 and rear sprocket(s) 14. Conversely, on courses with mostly downhill terrain, a large chain ring 70 having more teeth may be used to provide an advantageous speed ratio between the chain ring 70 and rear sprocket(s) 14. In order to switch between small and large chain rings 70, and also prevent chain-suck conditions $R_J$, $R_F$, multiple sets of guide fingers 57, 61 must be purchased, and properly trimmed. The properly trimmed guide fingers 57, 61 must also be interchanged each time a different size chain ring 70 is used.

With reference to FIGS. 7–9, a preferred embodiment of an improved chain guide apparatus 30' is illustrated. The chain guide apparatus 30' overcomes the above-described problems associated with a chain guide apparatus 30, which uses guide fingers 57, 61 to prevent chain-suck conditions $R_J$, $R_F$. As will be described in greater detail below, chain guide apparatus 30' advantageously provides a radial clearance distance between a leading connecting edge of the upper and lower guide blocks, respectively, and the chain ring. With such an arrangement, the drive chain may pass through a space between the upper or lower guide block and the chain ring, such as during a chain-suck condition, and may freely pass back through the space when the rider again alternates pedaling direction.

As with the chain guide apparatus 30 discussed above, the chain guide apparatus 30' of FIGS. 7–9 is preferably constructed for use with an off-road bicycle 10, or mountain bike, having a pair of pedal cranks 20, 22 (FIG. 1) mounted on opposing ends of a pedal crank shaft 24. A crank spider 25 is mounted on the pedal crank shaft 24 or, alternately, may be: defined by the pedal crank 22. The crank spider 25 carries a chain ring 70, which may vary in diameter and/or number of drive teeth 71. The teeth 71 of the chain ring 70 engage drive rollers 104 (FIG. 9), which are mounted on pins 106 (FIG. 8).of the drive chain 16 to transfer rider-produced torque to the rear wheel 2 of the bicycle 10, as illustrated in FIG. 1.

The chain guide apparatus 30' may be comprised of an inner frame, or guide support plate which preferably is configured to form an inner, bash guard 40', an outer frame, or bash ring which is configured to form an outer bash guard 31', an upper guide block 33' and, preferably, a lower guide block 34'. The outer bash guard 31' (illustrated in phantom in FIG. 7) defines a first plane A (FIG. 9) and is preferably fixed to the crank spider 25 such that the chain ring 70 is between the inner bash guard 40' and the outer bash guard 31'. Thus, the outer bash guard 31' rotates as a unit with the pedal cranks 20, 22 and crank spider 25. The inner bash guard 40' is suitably supported by a frame 11 of the bicycle 10 and defines a second plane B (FIG. 9). The inner bash guard 40' is situated between the frame 11 and chain ring 70. The upper guide block 33' is arranged such that the drive chain 16 passes through a guide channel 60' defined by the upper guide block 33' before engaging the chain ring 70. The lower guide block is arranged such that the drive chain 16 passes through a guide channel 63' after disengaging from the chain ring 70.

In a manner similar to the chain guide apparatus 30 of FIGS. 1–6, the improved chain guide apparatus 30' inhibits the drive chain 16 from becoming completely disengaged from the chain ring 70 by positioning the drive chain 16 for proper alignment with the chain ring 70, in spite of chain-whipping forces. The upper guide block 33' desirably substantially entirely surrounds the drive chain 16 as it passes through upper guide channel 60', thereby ensuring that the drive chain 16 is aligned with the chain ring 70 and positioned between the inner and outer bash guards 40', 31'.

Additionally, the forward extended ramp portion 36' of the upper guide block 33' prevents the chain 16 from jumping over the top portion of either the inner or outer bash guards 40', 31'. Advantageously, the upper guide block 33' is positioned relative to the outer bash guard 31' such that a radial space S between them is, preferably, less than the height H of a link 108 of the drive chain 16 (FIG. 9). More preferably, the space S is less than one-half the height H of a link 108 of the drive chain 16. This arrangement prevents the chain 16 from forcing its way from the guide channel 60' through space S. Additionally, although there is no space illustrated between the extended ramp portion 36' and the inner bash guard 40' in FIGS. 7–9, because they are integrally formed, an alternative embodiment could include such a radial space similar to the radial space S described immediately above.

Similarly, the lower guide block 34' preferably substantially entirely surrounds the drive chain 16 as is passes through lower guide channel 63', thereby ensuring that the drive chain 16 is aligned with the chain ring 70 and positioned between the inner and outer bash guards 40', 31' during reverse pedaling motion $P_R$. In addition, the guide channel 63' properly aligns the drive chain 16 to be received by rear derailleur 15 (FIG. 1) during forward pedaling motion $P_F$.

With reference to FIG. 9, a first distance $D_1$ is defined between the center of the chain ring 70 and an inner surface of the inner bash guard 40' and a second distance $D_2$ is defined between the center of the chain ring 70 and an inner surface of the outer bash guard 31'. The distances $D_1$, $D_2$ are each preferably less than a thickness T of the drive chain 16. Advantageously, such an arrangement ensures that the chain 16 cannot become jammed between either the inner or outer bash guard 40', 31' and the chain ring 70. If the chain 16 disengages from the chain ring 70 in an upward direction, it is first directed downward by the extended ramp portion 36' of the upper guide block 33' and then forced to drop into engagement with the chain ring 70 due to the distances $D_1$ and $D_2$ of the inner and outer bash guards 40', 31' being less than the thickness T of the chain 16.

With reference to FIG. 7, the front portion of the inner bash guard 40' of the improved chain guide apparatus 30' is substantially circular, such that it has generally the same diameter as the outer bash guard 31'. This is an improvement over the guide support plate 40 of chain guide apparatus 30 illustrated in FIGS. 1–6. The guide support plate 40 of chain guide apparatus 30 does not extend substantially forwardly from the upper guide block 33. In certain circumstances, with the design of FIGS. 1–6, enough slack could be developed in the upper, forward portion of the drive chain 16, due to chain-whipping forces, that the chain 16 could become completely disengaged from a frontal portion of the chain ring 70 and become trapped between the chain ring 70 and frame 11 of the bicycle 10. The circular front portion of inner bash guard 40' prevents this situation from occurring. Even if excessive slack is developed in the upper, forward portion of the chain 16, the circular front portion of the inner bash guard 40', in combination with the outer bash guard 31', repositions the chain 16 onto the chain ring 70, as described above. The inner bash guard 40' also includes a plurality of mud clearance slots 41' to allow mud to escape from between the inner and outer bash guards 40', 31'.

As described immediately above, the improved chain guide apparatus 30' performs in a substantially similar manner as chain guide apparatus 30 of FIGS. 1–6 to ensure proper alignment, and engagement, of the drive chain 16 and chain ring 70 during forward or reverse pedal motion, even despite the existence of substantial chain-whipping forces. However, the improved chain guide apparatus 30' is additionally configured to prevent chain-jamming conditions, while being easier to install and capable of working properly with chain rings 70 of differing diameter, without requiring a separate set of guide blocks 33', 34' for each chain ring 70 diameter that is desired to be utilized on the bicycle 10.

With reference to FIG. 9, the upper guide block 33' is preferably comprised of an inner portion 80' and an outer portion 100'. A channel roof portion 112 and a shaft 114 extend between the inner and outer portions 80', 100'. Preferably, the shaft 114 is generally cylindrical and supports a rotatable wheel 116. Thus, the channel roof portion 112 and wheel 116 define connecting portions of the upper guide block 33'. Desirably, the channel roof portion 112 and wheel 116 extend substantially the entire distance between the inner and outer portions 80', 100' and contain fasteners 50, 51, 52, 53. However, the channel roof portion 112 and wheel 116 may only extend sufficiently between the inner and outer portions 80', 100', or the first plane A and second plane B defined by the outer and inner bash guards, respectively, so that the channel roof portion 112 and wheel 116 limit movement of the drive chain 16 within the channel 60'. The channel roof portion 112 limits upward movement of a portion of the drive chain 16, while wheel 116 limits downward movement of a portion of the drive chain 16. As illustrated in FIG. 7, the channel roof portion 112 and wheel 116 at least partially define the upper guide channel 60'.

As described above, the drive chain 16 passes through the guide channel 60' and is directed onto the chain ring 70. The wheel 116 rotates with the movement of the drive chain 16, thus preventing wear of the shaft 114. The wheel 116 may be omitted and the upper and lower edges of the guide channel 60' would then be at least partially defined by the channel roof portion 112 and shaft 114.

The upper guide block 33' of the improved chain guide apparatus 30' also defines a radially innermost connecting edge 110. That is, the edge of the portion extending between the plane A defined by the outer bash guard 31' and the plane B defined by the inner bash guard 40' which is radially innermost. It is understood that the connecting portions, individually could comprise separate pieces.

A line X may be defined by the axis $A_C$ of the crank spindle 24 and the radially innermost connecting edge 110.

A point Y on line X is defined at a distance $C_R$ from the axis $A_C$. The distance $C_R$, in turn, is substantially equivalent to the radius of the chain ring 70 being used with the chain guide apparatus 30'. Accordingly, the distance $C_R$ will vary as differing chain rings 70 having differing numbers of teeth 71 and, thus, differing diameters are used in conjunction with the chain guide apparatus 30'. Preferably, a 46 tooth chain ring, having a diameter of approximately 7.299 inches, is the largest chain ring 70 typically used with chain guide apparatus 30'. Thus, when using a 46 tooth chain ring, the distance $C_R$ is substantially equal to approximately 3.65 inches (i.e., the radius of the chain ring). The remainder of line X, from the point Y to the connecting edge 110, defines a distance referred to by the reference character $U_R$. Thus, the length of line X is equivalent to the sum of the distance $C_R$ and the distance $U_R$.

The lower guide block 34' is also preferably comprised of an inner portion 118 (FIG. 7) and an outer portion 120 (FIG. 8). The inner and outer portions 118, 120 are connected by a first shaft 122, a second shaft 124 and a ramp portion 126. Preferably, the first shaft 122 is generally cylindrical and supports a wheel 128 for rotation thereon. Thus, first shaft 122, second shafts 124 and wheel 128 define connecting portions of the lower guide block 34'. As illustrated in FIG. 7, the wheel 128 and ramp portion 126 define the lower portion of lower guide channel 63' while the second shaft 124 defines the upper portion of lower guide channel 63'.

As described above, the drive chain 16 passes through the guide channel 63' and is aligned onto the chain ring 70 during reverse pedaling motion $P_R$. The wheel 128 rotates with the movement of the drive chain 16, thus preventing wear of the first shaft 122.

In a similar manner to the upper guide block 33', the lower guide block 34' also defines a radially innermost connecting edge 130. The connecting edge 130 is defined by the edge of the portion extending between plane A and plane B which is radially innermost. A line Q may be defined by the axis $A_C$ of the crank spindle 24 and the connecting edge 130. A point R on line Q is defined at the same distance $C_R$ from the axis $A_C$ as defined in relation to the innermost connecting edge 110 of the upper guide block 33'. This is a result of the distance $C_R$ being related to the radius of the chain ring 70, which remains constant in relation to the axis $A_C$, when described in relation to either line X or Q. The remainder of line Q, from the point R to the connecting edge 130, defines a distance referred to by the reference character $L_C$. Thus, the length of line Q is equivalent to the sum of the distance $C_R$ and the distance $L_C$.

FIG. 8 illustrates the improved chain guide device 30' without the outer portions 100', 120' of the upper and lower guide blocks 33', 34', respectively, in order to better illustrate the upper guide channel 60' and lower guide channel 63'. As discussed above, FIG. 8 also illustrates the two chain jamming, or chain-suck, conditions $R_J$, $F_J$. The chain-suck condition $R_J$ typically occurs during reverse pedaling motion $P_R$ while the chain-suck condition $F_J$ usually occurs during forward pedaling motion $P_F$.

Additionally, FIG. 8 illustrates two of the possible configurations that the drive chain 16 may assume in returning from a chain-suck condition $R_J$, $F_J$ to a normal drive condition N. The chain-suck condition $R_J$ illustrates a configuration of the drive chain 16 wherein a link 108 is aligned substantially parallel to the line X (FIG. 7). If the chain 16 assumes such a configuration, a clearance distance between the teeth 71 of the chain ring 70 and the leading edge 110 at least equal to the length L of a link 108 is necessary to ensure that the chain 16 does not become jammed.

The chain-suck condition $F_J$ illustrates a configuration of the drive chain 16 wherein the chain 16 is folded over on itself. If the chain 16 assumes such a configuration, a clearance distance between the teeth 71 of the chain ring 70 and the leading edge 110 at least equal to twice the height H of a link 108 is necessary to ensure that the chain 16 does not become jammed. Of course, either chain configuration may be assumed in either chain-suck position $R_J$ or $F_J$. That is, a configuration wherein a link 108 is substantially parallel to the line Q may exist in relation to the lower guide block 34' as a result of forward pedaling motion $P_F$. Similarly, a configuration wherein the chain 16 is doubled over on itself may exist in relation to the upper guide block 33', as a result of reverse pedaling motion $P_R$.

Advantageously, the chain guide apparatus 30' is desirably configured such that the distance $U_R$ of the upper guide block 33' and distance $L_C$ of the lower guide block 34' is at least twice the height H of a link 108 for the largest diameter chain ring 70 that is desirably used with the chain guide apparatus 30'. Preferably, the distances $U_R$ and $L_C$ are substantially the length L of a link 108. The length L may be greater than twice the height H with some chains 16, while twice the height H may be greater than the length L for other chains 16. More preferably, the distances $U_R$ and $L_C$ are at least slightly greater than the length L of a link 108. Most preferably, the distances $U_R$ and $L_C$ are slightly greater than the length L of a link 108 of the drive chain 16.

Although it is desirable to have a minimum distance $U_R$, $L_C$ between the radially innermost connection edges 110, 130, respectively, and the chain ring 70, it is also desirable to limit this dimension in order to limit the maximum radial dimension of the chain guide apparatus 30'. Limiting the maximum radial dimension of the chain guide apparatus 30' provides clearance for the bicycle frame 11 (FIG. 1), the articulating portions of the frame 11 and other components, such as a rear shock (not shown) and rear brake (not shown). This allows the chain guide apparatus 30' to fit a wide variety of bicycles built by different manufacturers. Accordingly, the desirable distance $U_R$, $L_C$ between the radially innermost connection edges 110, 130, respectively, and the chain ring 70 is not substantially greater than necessary to prevent chain-suck conditions $R_J$ and $F_J$. It has been determined that a dimension of 0.050 inches greater than the length L of a chain link 108 provides a desirable compromise between providing enough clearance to prevent jamming of the chain 16 while retaining an acceptable maximum radial dimension of the chain guide apparatus 30'. A link 108 of a preferred drive chain 16 has a length L of approximately 0.815 inches. Therefore, a desirable dimension for the distances $U_R$ and $L_C$ is approximately 0.865 inches.

Accordingly, even if the chain 16 assumes either configuration illustrated in chain-suck condition $R_J$ or $F_J$ during reverse pedaling motion $P_R$, the chain 16 is able to freely pass between the connecting edge 110 of the upper guide block 33' and the teeth 71 of chain ring 70, to normal drive position N, once forward pedaling motion is initiated. Similarly, if the chain 16 assumes either configuration illustrated in chain-suck condition $R_J$ or $F_J$ during forward pedaling motion $P_F$, the chain 16 is able to freely pass between the leading edge 130 of the lower guide block 34' and the teeth 71 of chain ring 70, to normal drive position N, once reverse pedaling motion is initiated.

Thus, the improved chain guide apparatus 30' effectively aligns the drive chain 16 with the chain ring 70, and ensures that it does not become disengaged therefrom. Additionally, the chain guide apparatus 30' advantageously eliminates chain-jamming problems due to chain suck conditions while also being easy to install and maintain. Advantageously, chain rings 70 of differing diameters may be used with chain guide apparatus 30' without requiring modification of the apparatus 30'.

Although the present invention has been described in terms of certain preferred embodiments, it is to be understood that the scope of the invention is not to be limited thereby. Instead, Applicant intends that the scope of the invention be limited solely by reference to the appended claims, and that the variations which are apparent to those of skill in the art will fall within the scope of the Applicant's invention.

What is claimed is:

1. A chain guide apparatus for use with a bicycle drive system having a pedal crank, a chain ring rotated about an axis thereby, a frame supporting the pedal crank and a drive chain engaging the chain ring, said chain guide apparatus comprising:

an outer bash guard;

an inner bash guard;

a first guide extending between said outer bash guard and said inner bash guard, said first guide substantially entirely surrounding a channel sized and shaped to receive a drive chain, said first guide defining an inner portion, an outer portion, a first connecting portion extending between said inner portion and said outer portion and a second connecting portion extending between said inner portion and said outer portion, said first connecting portion configured to limit downward movement of a portion of the drive chain in said channel and defining the radially innermost connecting edge of said first guide, said radially innermost connecting edge of said first guide being separated from said chain ring by a first radial distance equal to at least twice the height of said drive chain.

2. The apparatus of claim 1, wherein said first radial distance is equal to at least substantially the length of a link of said drive chain.

3. The apparatus of claim 1, wherein said first connecting portion comprises a wheel.

4. The apparatus of claim 1, wherein said outer portion is radially spaced from said outer bash guard a third distance less than the height of said drive chain.

5. The apparatus of claim 1, further comprising a second guide extending between said outer bash guard and said inner bash guard, said second guide being spaced from said first guide and substantially entirely surrounding a channel, said channel sized and shaped to receive a drive chain.

6. A chain guide apparatus for use with a bicycle drive system having a pedal crank, a chain ring, rotated about an axis thereby, a bicycle frame supporting the pedal crank and a drive chain engaging the chain ring, said chain guide apparatus comprising:

an outer frame mountable to at least one of a crank spider and a chain ring defining a crank axis;

an inner frame;

a first guide extending between said outer frame and said inner frame, said first guide substantially entirely surrounding a channel sized and shaped to receive a drive chain, said first guide defining an inner portion, an outer portion, a first connecting portion extending between said inner portion and said outer portion and a second connecting portion extending between said inner portion and said outer portion, said first connecting portion configured to limit downward movement of a portion of the drive chain in said channel and defining the radially innermost connecting edge of said first guide, said radially innermost connecting edge of said first guide being located at least a first radial distance from a first point, said first point being located at least a second radial distance from said crank axis, wherein said first radial distance is at least 0.865 inches and said second radial distance is less than approximately 7.299 inches.

7. A chain guide apparatus for use with a bicycle drive system having a pedal crank, a chain ring rotated about an axis thereby, a frame supporting the pedal crank and a drive chain engaging the chain ring, said chain guide apparatus comprising:

an outer bash guard defining a first plane;

an inner bash guard defining a second plane;

a first guide extending between said outer bash guard and said inner bash guard, said first guide defining a channel sized and shaped to receive a drive chain, said first guide defining a first connecting portion extending between said first plane and said second plane and configured to limit downward movement of a portion of said drive chain within said channel, said first guide defining a second connecting portion extending between said first plane and said second plane and configured to limit upward movement of a portion of said drive chain within said channel, said first connecting portion defining the radially innermost connecting edge of said first guide, said radially innermost connecting edge of said first guide being separated from said chain ring by a first radial distance equal to at least twice the height of said drive chain.

8. The apparatus of claim 7, wherein said first radial distance is equal to at least substantially the length of a link of said drive chain.

9. The apparatus of claim 7, wherein said first connecting portion comprises a wheel.

10. The apparatus of claim 7, wherein said outer portion is radially spaced from said outer bash guard a third distance less than the height of said drive chain.

11. A chain guide apparatus for use with a bicycle drive system having a pedal crank, a chain ring rotated about an axis thereby, a bicycle frame supporting the pedal crank and a drive chain engaging the chain ring, said chain guide apparatus comprising:

an outer frame defining a first plane and mountable to at least one of a crank spider and a chain ring defining a crank axis;

an inner frame defining a second plane;

a first guide extending between said outer frame and said inner frame, said first guide defining a channel sized and shaped to receive a drive chain, said first guide defining a first connecting portion extending between said first plane and said second plane and configured to limit downward movement of a portion of said drive chain within said channel, said first guide defining a second connecting portion extending between said first plane and said second plane and configured to limit upward movement of at least a portion of said drive chain within said channel, said first connecting portion defining the radially innermost connecting edge of said first guide, said radially innermost connecting edge of said first guide being located at least a first radial distance from a first point, said first point being located at least a second radial distance from said crank axis, wherein said first radial distance is at least 0.865 inches and said second radial distance is less than approximately 7.299 inches.

12. A bicycle comprising a drive system having a pedal crank, a chain ring rotated about an axis by said pedal crank, a frame supporting said pedal crank and a drive chain engaging said chain ring, a chain guide apparatus comprising an outer bash guard, an inner bash guard, a first guide extending between said outer bash guard and said inner bash guard, said first guide substantially entirely surrounding a channel sized and shaped to receive a drive chain, said first guide defining an inner portion, an outer portion, a first connecting portion extending between said inner portion and said outer portion and a second connecting portion extending between said inner portion and said outer portion, said first connecting portion configured to limit downward movement of a portion of the drive chain in said channel and defining the radially innermost connecting edge of said first guide, said radially innermost connecting edge of said first guide being separated from said chain ring by a first radial distance equal to at least twice the height of said drive chain.

13. The apparatus of claim 12, wherein said first radial distance is equal to at least substantially the length of a link of said drive chain.

14. The apparatus of claim 12, wherein said first connecting portion comprises a wheel.

15. The apparatus of claim 12, wherein said outer portion is radially spaced from said outer bash guard a third distance less than the height of said drive chain.

16. The apparatus of claim 12, further comprising a second guide extending between said outer bash guard and said inner bash guard, said second guide being spaced from said first guide and substantially entirely surrounding a channel, said channel sized and shaped to receive a drive chain.

* * * * *